Dec. 16, 1952  L. COLEMAN  2,621,491
REFRIGERATING APPARATUS
Filed March 1, 1949
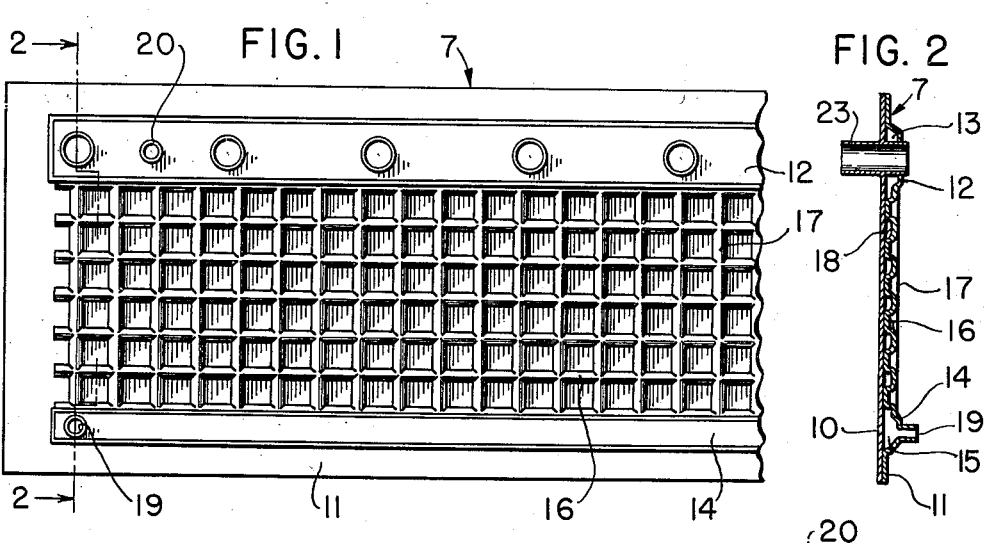
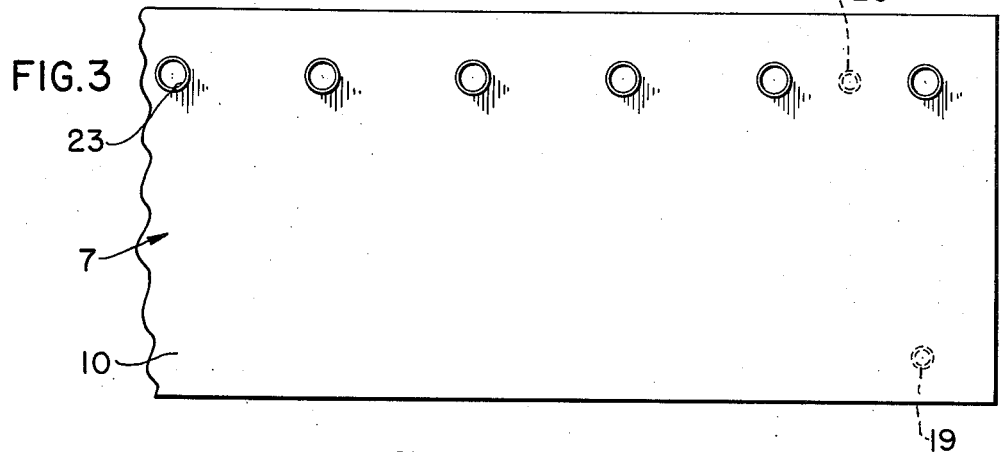
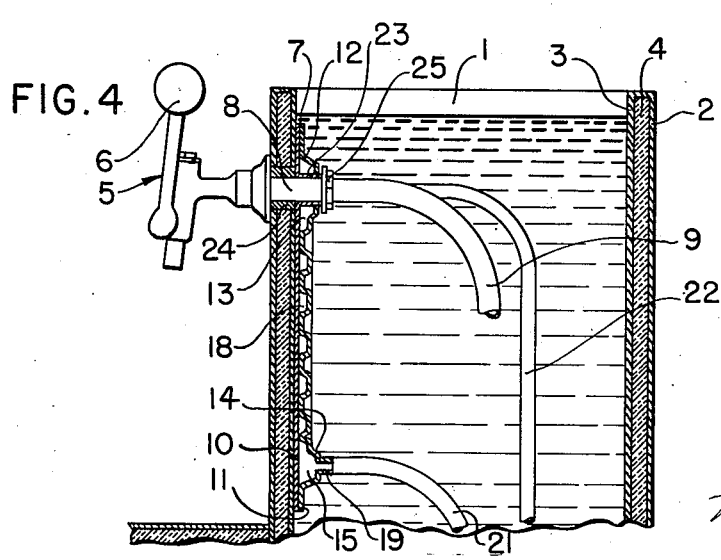
INVENTOR
Louis Coleman
BY
William F. Nickel
ATTORNEY Patented Dec. 16, 1952

2,621,491

UNITED STATES PATENT OFFICE 2,621,491

REFRIGERATING APPARATUS

Louis Coleman, Westwood, N. J., assignor, by mesne assignments, to Samuel Lee, Brooklyn, N. Y.

Application March 1, 1949, Serial No. 78,913

2 Claims. (Cl. 62—141)

This invention is an improvement in refrigerating apparatus; and particularly apparatus for cooling beer and similar beverages at counters and bars where it is drawn and served.

An important object of this invention is to provide apparatus for keeping beer cool at the tap or faucet through which it is discharged into a drinking glass, and to which it is delivered from a refrigerated chamber through insulated pipes or conduits. The foam is thus reduced, the glass can be quickly and properly filled, and waste is entirely eliminated.

To this end the apparatus includes a refrigerating member located in the casing on the exterior of which the faucets are mounted, and to which the pipes that conduct the beer from the refrigerating compartment to the bar are coupled. The faucets project into the casing and their inner extremities are maintained in contact with said member. Thus sufficient heat is removed from the faucets and the temperature of the latter is prevented from rising to an undesirable degree.

A further object of this invention is to provide a member for cooling the faucets through which the beer is delivered, with suitable means for engaging and supporting the faucets, and having internal passages, with an inlet and outlet, for the circulation of a refrigerating medium capable of producing the required cooling effect.

The nature and advantages of the invention are fully described herein and a preferred form in which it is embodied is illustrated in the accompanying drawings. But the disclosure is by way of example only, and the improvement can be varied in numerous structural details, without departing from the principal characteristics which are recited in the appended claims.

On the drawings:

Figure 1 is a rear view of the member which cools the faucets through which the beer is drawn.

Figure 2 is a vertical section on the line 2—2 in Figure 1.

Figure 3 is a front view of said member; and

Figure 4 is a sectional view in a vertical plane of the member and the casing, with the faucets, in assembled relation and readiness for use.

The numeral 1 indicates a casing of approved design having an outer wall 2 and an inner wall 3, with a space between that can be filled by a suitable insulating substance at 4. This casing is mounted adjacent the bar behind which the attendant stands, and the rear of the casing carries a number of faucets 5 with handles 6 to control the delivery of the beer into glasses. In the casing adjacent the wall which carries the faucets or spigots 5 is a refrigerating member 7 with a suitable internal ducts or passages through which a refrigerating medium flows; and this medium cools the inner ends of the faucets 5 to prevent any beer or like beverage from being warmed therein, especially when the taps 5 are closed for intervals of greater or less length. The rear end or shank of each faucet is shown at 8 extending through the wall of the casing and through the refrigerating member 7, and connected to pipes 9 which lead to kegs in a separate refrigerating compartment, the beer from the kegs being forced by pressure through the pipes 9 whenever the handles 6 are turned to open the taps or the faucets 5. These pipes are insulated over their entire extent between the refrigerating compartment, and the interior of the casing can be kept cool in any suitable way.

The member 7 is disposed against the rear wall of the casing 1 and covers a considerable portion thereof. It has the form of a rectangle with the long sides horizontal. The top lies adjacent the faucets 5 and the bottom is below the same. The member is made of a flat front plate 10, which is in contact with the adjacent wall of the casing, and a rear plate 11 welded thereto. Both plates are impregnated with zinc to prevent corrosion. The rear plate 11 is shaped to contain therein the various ducts and channels through which the refrigerant passes. At the top it has a rib 12 which makes a longitudinal channel or header 13, extending virtually from end to end of the member at the level of the faucets 5, and at the bottom is a similar rib 14, between which and the plate 10 is a longitudinal channel or a header 15 inside the member 7. Between the two headers 13 and 15 the plate 11 is stamped to form longitudinal ribs 16 and intersecting vertical ribs 17 enclosing hollow ducts 18 in the form of a network extending over substantially the entire area of the plate 11. The vertical ducts 18 communicate with the headers 13 and 15. The back plate 11 also has a nipple 19 at one end of the rib 14, and the rib 12 has a similar boss or nipple 20 near one end. The nipple 19 is connected to a pipe 21 which conducts the refrigerant into the member 7, and the nipple 20 is connected to an outlet pipe 22.

The member 7 also has a series of sleeves 23 which extend through it and are arranged in a horizontal row along the header 13. The refrigerant in the header 13 of course comes into direct contact with these sleeves. Each sleeve projects beyond both the plates 10 and 11, and when the member 7 is mounted in the casing 1 the sleeves extend through the adjacent wall of the casing and receive the shanks 8 of the faucets, the extremities of the shanks inside the casing being coupled to the pipes 9. The openings through the walls of the casing for the sleeves 23 are lined with bronze bushings 24 and are soldered to the walls 2 and 3 and made leakproof. The couplings for the pipes 9 and the faucets in the casing are indicated at 25.

In practice the beer transmitted to each of the faucets 5 is refrigerated not only up to the point where each pipe 9 is coupled to the faucets in the sleeves 23, but also in the shanks 8 up to the valves in the faucets which are actuated by the handles 6. The refrigerating medium flowing into the lower part of the member 7 cools the entire area of this member and keeps the adjacent part of the casing cool also. The refrigerant in the header 13 reduces the temperature of the sleeves 23 which are in contact with the inner ends 8 of the faucets 5 by extracting heat therefrom. Thus beer in the faucets is kept cool even when the faucet is shut for a long period.

In practice it is desirable to prevent the temperature of beer served in this way from rising above 39 or 40 degrees. It may be cool enough in the pipes 9, but unless the beer in the faucet is kept cool when the faucet is not open to draw it, the beer will have a temperature above 39 or 40 degrees, and this warm beer is the first to be discharged. It usually is expelled with a sputtering sound, and is technically called "spit." It is very foamy and the beer as it fills the glass becomes what is technically known as "wild beer," being forthy and foam-laden; and the greater part of the glass receiving it becomes foam-filled, requiring time for clearing, scraping off at the top with the bartender's flat stick, and several additions from the faucet 5 before the beer in the glass has the foam only on the top, and the beer is ready for drinking. But with the faucets 5 kept cool by means of the member 7 and sleeves 23, the formation of "wild beer" is prevented and the glass receiving it can be properly filled at once, having foam in only a moderate layer at the top. Excessive foam is not present and no removal of foam and subsequent additions from the faucet are not required.

Having described my invention, what I believe to be new is:

1. Refrigerating apparatus comprising a casing, delivery faucets mounted adjacent the outer face of a wall thereof, and projecting at their inner ends into said casing, a pair of plates having leakproof connection along their edges, one of said plates having a channel extending parallel to said faucets, sleeves in said plates extending through said channel, said sleeves enveloping the ends of said faucets, the first-named plate having a second channel parallel to the first, said first-named plate having longitudinal and transverse hollow ribs forming ducts connecting said channels and one another, the second channel having an inlet and the first channel an outlet for a refrigerant and bushings having leakproof connection with said wall of the casing, enveloping said sleeves.

2. Refrigerating apparatus comprising a casing, delivery faucets mounted adjacent the outer face of a wall thereof, and projecting at their inner ends into said casing, a pair of plates having leakproof connection along their edges, one of said plates having a channel extending parallel to said faucets, sleeves in said plates extending through said channel, said sleeves enveloping the ends of said faucets, the first-named plate having a second channel parallel to the first, said first-named plate having longitudinal and transverse hollow ribs forming ducts connecting said channels and one another, the second channel having an inlet and the first channel an outlet for a refrigerant and bushings having leakproof connection with said wall of the casing enveloping said sleeves, said wall being hollow and the bushings being flush at their ends with the outer and inner faces thereof.

LOUIS COLEMAN.

REFERENCES CITED

The following references are of record in the file of this patent:

UNITED STATES PATENTS

| Number | Name | Date |
|---|---|---|
| 2,080,975 | Riesgo | June 8, 1937 |
| 2,316,376 | Weiss | Apr. 13, 1943 |
| 2,327,910 | Levine | Aug. 24, 1943 |
| 2,349,695 | Beane | May 23, 1944 |